(12) United States Patent
Chakravarth et al.

(10) Patent No.: US 9,488,975 B2
(45) Date of Patent: Nov. 8, 2016

(54) METHODS AND MEDIA FOR LOT DISPATCH PRIORITY

(71) Applicant: GLOBALFOUNDRIES Singapore Pte. Ltd., Singapore (SG)

(72) Inventors: Madan Mohan Chakravarth, Mechanicville, NY (US); Muralitharan R. Subramaniam, Clifton Park, NY (US)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 260 days.

(21) Appl. No.: 14/132,281

(22) Filed: Dec. 18, 2013

(65) Prior Publication Data

US 2015/0168948 A1 Jun. 18, 2015

(51) Int. Cl.
*G05B 19/418* (2006.01)
(52) U.S. Cl.
CPC .......... *G05B 19/41865* (2013.01); *Y02P 90/02* (2015.11)
(58) Field of Classification Search
None
See application file for complete search history.

(56) References Cited

U.S. PATENT DOCUMENTS

| 4,958,292 A | * | 9/1990 | Kaneko | G05B 19/41865 700/106 |
| 7,127,310 B1 | * | 10/2006 | Barto | G05B 19/41865 700/100 |
| 7,460,920 B1 | * | 12/2008 | Qu | G05B 19/41885 700/100 |
| 2007/0225848 A1 | * | 9/2007 | Chang | G06Q 10/06 700/101 |

OTHER PUBLICATIONS

Rose, "Comparison of Due-date Oriented Dispatch Rules in Semi-conductor Manufacturing", Department of Distributed Systems, Institute of Computer Science, University of Wurzburg, German, 6 pages.

* cited by examiner

*Primary Examiner* — Ryan Jarrett
(74) *Attorney, Agent, or Firm* — Lorenz & Kopf, LLP

(57) ABSTRACT

Methods and media for prioritizing dispatch during semiconductor manufacturing are provided. A method of prioritizing dispatch of a lot during semiconductor fabrication includes calculating a lot level goal and prioritizing dispatch of the lot based on the lot level goal. Calculating the lot level goal for processing time of the lot includes calculating the lot level goal based on a normal goal in response to a lack of delay in processing the lot or in response to a recovered delay in processing the lot. Calculating the lot level goal further includes calculating the lot level goal based on a vectored goal in response to a delay in processing the lot and based at least in part on a predetermined time in which to reduce the normal goal to recover from a delay in processing the lot.

20 Claims, 2 Drawing Sheets

METHODS AND MEDIA FOR LOT DISPATCH PRIORITY

TECHNICAL FIELD

Embodiments of the present disclosure are generally directed to methods and media for semiconductor wafer handling. More particularly, embodiments of the present disclosure are directed to methods and media for prioritizing wafer lot dispatch during semiconductor device fabrication.

BACKGROUND

In the global market, manufacturers of mass products must offer high quality devices at a low price. It is thus important to improve yield and process efficiency to minimize production costs. This holds especially true in the field of semiconductor fabrication, where it is essential to combine cutting-edge technology with volume production techniques. It is the goal of semiconductor manufacturers to reduce the consumption of raw materials and consumables while at the same time improving process tool utilization. Improving process tool utilization is especially important in modern semiconductor facilities where extremely costly equipment often represents the dominant part of the total production costs.

Integrated circuits are typically manufactured in automated or semi-automated facilities by passing substrates through a large number of process steps to complete the devices. The number and the type of process steps a semiconductor device has to go through may depend on the specifics of the semiconductor device to be fabricated. For instance, a sophisticated Central Processing Unit (CPU) may require several hundred process steps, each of which has to be carried out within specified process margins to fulfill the specifications for the device under consideration.

In a semiconductor facility, a plurality of different product types are usually manufactured at the same time, such as memory chips of different design and storage capacity, CPUs of different design and operating speed, and the like. The number of different product types may even reach a hundred or more in production lines for manufacturing ASICs (Application Specific ICs). Each of the different product types may require a specific process flow, and require different mask sets for lithography and specific settings in various process tools, such as deposition tools, etch tools, implantation tools, chemical mechanical polishing (CMP) tools and the like. Consequently, a plurality of different tool parameter settings and product types may be encountered simultaneously in a manufacturing environment. Thus, a mixture of product types, such as test and development products, pilot products, and different versions of products, at different manufacturing stages, may be present in the manufacturing environment at a time. Further, the composition of the mixture may vary over time depending on economic constraints and the like, since the dispatching of non-processed substrates into the manufacturing environment may depend on various factors, such as the ordering of specific products, a variable degree of research and development efforts and the like. Thus, the various product types may have to be processed with varying priority to meet requirements imposed by specific economic or other constraints.

A typical method of prioritizing dispatch among the devices involves calculating a traditional critical ratio for semiconductor substrates that are grouped into lots. The traditional critical ratio is a ratio of the time remaining until the scheduled shipment of the devices to the processing time remaining to be performed before the devices are completed. When multiple lots are waiting for processing on a given tool, the lot with the smallest traditional critical ratio is typically selected for processing when the tool is next available. The traditional critical ratio is sensitive to delays in processing near the end of a production cycle of a semiconductor device, but is not very sensitive to delays in processing near the beginning or middle of the production cycle. Although the traditional critical ratio is suitable for its intended purpose, the need for improved lot dispatching methods in complex semiconductor manufacturing facilities is ever present.

As such, it is desirable to provide improved methods and media for lot dispatching during semiconductor device fabrication. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods and media for prioritizing dispatch of a lot during semiconductor fabrication are disclosed herein. In an exemplary embodiment, a method of prioritizing dispatch of a lot during semiconductor fabrication includes calculating a lot level goal and prioritizing dispatch of the lot based on the lot level goal. Calculating the lot level goal for processing time of the lot includes calculating the lot level goal based on a normal goal in response to a lack of delay in processing the lot or in response to a recovered delay in processing the lot. Calculating the lot level goal further includes calculating the lot level goal based on a vectored goal in response to a delay in processing the lot and based at least in part on a predetermined time in which to reduce the normal goal to recover from a delay in processing the lot.

In accordance with another exemplary embodiment, a method of fabricating a semiconductor device from a substrate includes providing a lot that includes the substrate, prioritizing dispatch of the lot according to a dispatch method, and processing the lot based on the dispatch method. The dispatch method includes calculating a lot level goal and prioritizing dispatch of the lot based on the lot level goal. Calculating the lot level goal for processing time of the lot includes calculating the lot level goal based on a normal goal in response to a lack of delay in processing the lot or in response to a recovered delay in processing the lot. Calculating the lot level goal further includes calculating the lot level goal based on a vectored goal in response to a delay in processing the lot and based at least in part on a predetermined time in which to reduce the normal goal to recover from a delay in processing the lot.

In accordance with another exemplary embodiment, a non-transitory computer readable medium storing control logic for operating a computer system includes control logic instructions. The control logic instructions are configured for calculating a lot level goal and prioritizing dispatch of a lot based at least in part on the lot level goal. Calculating a lot level goal for processing time of the lot during semiconductor fabrication is calculated based on a normal goal in response to a lack of delay in processing the lot or in response to a recovered delay in processing the lot. Calculating the lot level goal for processing time of the lot is calculated based on a vectored goal in response to a delay in processing the lot. The vectored goal is based at least in part on a predetermined time in which to reduce the normal goal to recover from a delay in processing the lot.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the present disclosure will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the present disclosure provide methods of prioritizing a lot during semiconductor fabrication. The methods use a weighted dispatch index that is configured to recover from processing delays by increasing a processing time goal for a specified period of time after the delay, as will be described below.

Figure 1:
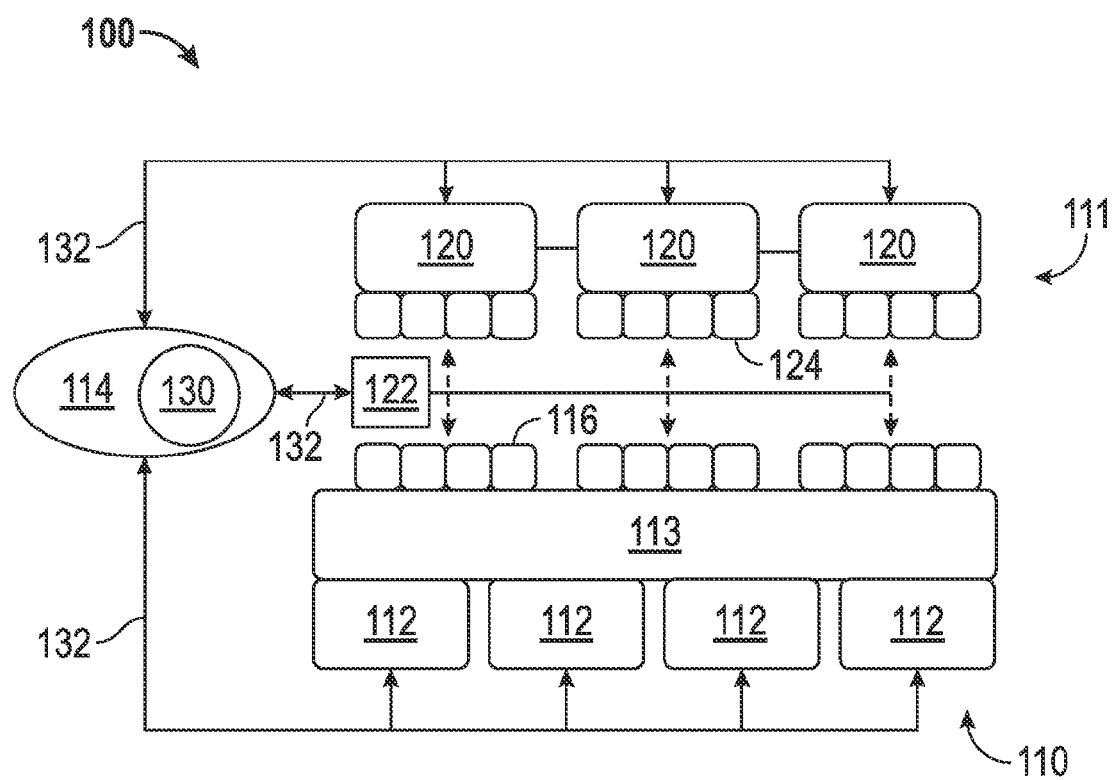
FIG. 1 is a simplified diagram of a fabrication system in accordance with various embodiments.

Referring now to FIG. 1, a fabrication system 100 for fabricating semiconductor devices is illustrated in accordance with some embodiments. The fabrication system 100 includes processing equipment 110, storage and transport equipment 111, and a controller 114. The fabrication system 100 processes semiconductor substrate lots according to a dispatch priority, as will be explained below. The lots may include any number of substrates that are to be processed together and may be packaged for common distribution in any suitable carrier, as will be appreciated by those with skill in the art.

Processing equipment 110 may include any process module or process tool for performing a fabrication process, a metrology process, a sorting process or a handling process. In the example provided, processing equipment 110 includes equipment units 112, an Equipment Front End Module (EFEM) 113, and equipment ports 116. "Equipment unit" is used herein to refer to any process equipment, such as process modules and process tools, whether for fabricating, measuring, sorting, or handling. As used herein, a process may refer to a fabrication, metrology, sorting or handling process, as will be appreciated by those with skill in the art. It should be appreciated that other configurations of processing equipment 110 may be utilized without departing from the scope of the present disclosure.

During processing, substrates are loaded at one of the equipment ports 116 and delivered to an equipment unit 112 through the EFEM's internal substrate handling mechanism. In some embodiments, the EFEM 113 may be configured so that equipment ports 116 are identified for dedicated service to a specific equipment unit 112. In alternative embodiments, any equipment port 116 may be used to deliver or remove substrates from a particular equipment unit 112.

Storage and transport equipment 111 includes storage units 120 and a transport system 122. The storage units 120 store substrate lots between processing on processing equipment 110. The storage units 120 include input/output ports 124 for receiving substrate lots and making available various substrate lots for transport by transport system 122. Transport system 122 transports substrate lots throughout the fabrication system 100 and between the input/output ports 124 and the equipment ports 116 to deliver the substrate lots for processing. Transport system 122 may include any suitable components for automated material handling, such as an overhead transport system.

Controller 114 is a computer system that may include any control circuitry capable of performing the various steps described below. For example, the control logic may be a processor, such as a microprocessor, microcontroller, or digital signal processor (DSP), configured to execute instructions directing the processor to perform the steps enumerated below. In another implementation, the control logic may be hardware-based logic, or may include a combination of hardware, firmware, and/or software elements.

The controller 114 includes a memory 130. The memory 130 may be any device or component capable of storing digital data, such as one or more integrated circuits of static random access memory (SRAM), dynamic random access memory (DRAM), flash memory, and the like. In another implementation, the memory 130 may be a magnetic or optical disk drive, or other type of storage device. Further, while the memory 130 is depicted as residing within the controller 114, the memory 130 may be located external to the controller 114 and coupled to the controller 114 by way of a dedicated connection, communication network, or other communication means.

Controller 114 is coupled for electronic communication with the processing equipment 110 and storage and transport system 111 by interconnects 132. Interconnects 132 may be any suitable communication links, such as various forms of wired or wireless network connections, as will be appreciated by those with skill in the art. Controller 114 continuously receives equipment and processing data from processing equipment 110, which may include a predicted process completion time, the identity of substrate lots at the equipment unit 112, the number of steps remaining in a process at the equipment unit 112, the status of equipment ports 116 (whether vacant or occupied) at the equipment unit 112, or other information related to the substrate lots. Controller 114 also continuously receives equipment and processing data from storage and transport system 111, such as the status of input/output ports 124 (vacant or occupied), the identify of substrate lots at the local storage units 120, substrate temperature data, equipment temperature data, storage device temperature data, sensor information, process parameters, preventative maintenance data, carrier state information, substrate location and/or process data, and/or robot interlock information among other equipment and storage information. It should be appreciated that other types of information may be communicated to the controller without departing from the scope of the present disclosure.

Figure 2:
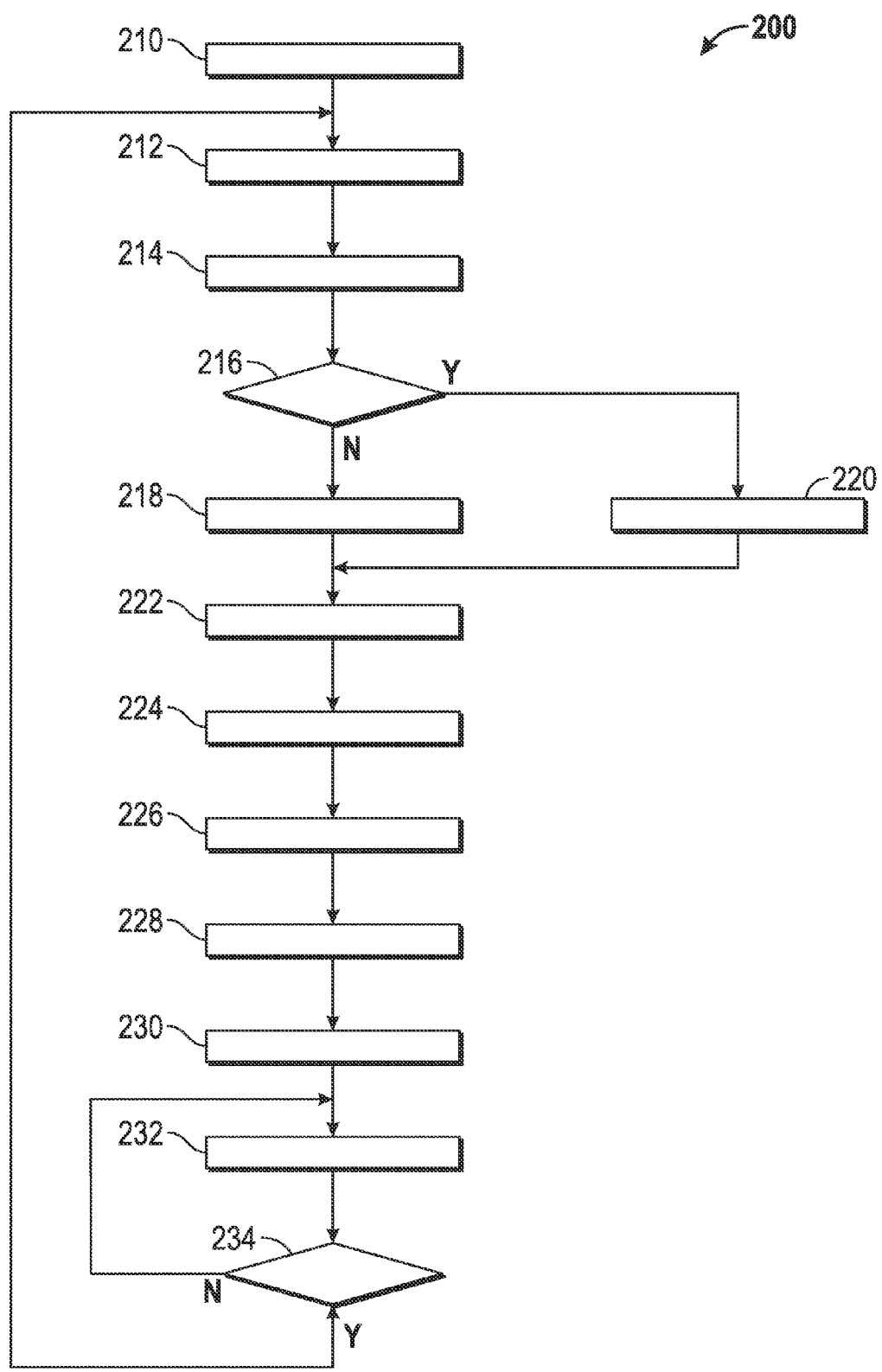
FIG. 2 is a flow diagram for a method of fabricating a semiconductor device in accordance with various embodiments.

Referring now to FIG. 2, a method 200 of fabricating a semiconductor device is illustrated in flow diagram form in accordance with some embodiments. In the example provided, steps of the method 200 are performed by the components of the fabrication system 100. For example, the transport system 122 may transport substrate lots between the storage units 120 and processing equipment 110 to complete processing of the semiconductor device.

In step 210, lots are provided that each includes semiconductor substrates. The lots each include at least one semiconductor substrate on which the processes of the semiconductor fabrication are to be performed. In the example provided, the lots include all substrates that are waiting for processing by the fabrication system 100.

The controller 114 prioritizes dispatch of the lots to the processing equipment 110 based on a dispatch priority calculated according to the steps described below. In general, the dispatch priority recovers within a predetermined amount of time from a delay in substrate processing. For example, a substrate lot delayed by a malfunctioning processing tool may be given a high priority until the substrate lot has recovered from the delay, as will be described below. In some embodiments, the steps of the method 200 are instructions in control logic stored on a non-transitory computer readable medium. For example, the steps may be part of selectable dispatch rules within a manufacturing execution system or other facility management software, as will be appreciated by those with skill in the art.

In step 212, controller 114 calculates a normal goal for each of the lots. The normal goal may be any goal that indicates an amount of time to process the lot without considering recovery from delays prior to completion of the semiconductor device. For example, a traditional critical ratio does not recover from the delay prior to completion of the semiconductor device, but rather spreads the recovery evenly among the remaining time to recover exactly at completion of the semiconductor device. Therefore, a traditional critical ratio may be suitable for use as the normal goal. In the example provided, the normal goal is based on a processing time remaining for the lot and the remaining time before a due date of the lot. More specifically, the example provided calculates the normal goal as the theoretical processing time remaining for the lot before the lot is complete divided by the remaining time before the due date of the lot.

Controller 114 calculates a vectored goal for each of the substrate lots in step 214. The vectored goal indicates an amount of time to process the lot in order to recover from a delay in processing the lot within a predetermined time in which to recover from the delay. The predetermined time may be selected according to any suitable criteria, such as the typical number of processes to be completed or the typical time between a due date and a start date within a given fabrication facility. In the example provided, the predetermined time is one day. The vectored goal is based on the start date of the lot, a total amount of processing for the lot, a difference between the start date of the lot and a due date of the lot, and the completed processing time of the lot. The start date is the date when the lot first started fabrication in the fabrication system 100. The total amount of processing is the sum of the theoretical amount of time that the lot will be processed between the start date and completion of the semiconductor device.

More specifically, the controller 114 calculates the vectored goal according to:

$$TodayGoalsInHrs = \frac{24 * \left(\left(\frac{(n - StartDate) * TotalPTInDays}{DueDate - StartDate}\right) - ElapsedPTInDays\right)}{n - Today}$$

where TodayGoalsInHrs is the vectored goal indicating a number of hours to process the lot in the current day in order to recover from the delay. The predetermined time is represented by "n," StartDate is the start date of the lot, TotalPTInDays is the total amount of processing for the lot, DueDate is the date of scheduled completion of the lot, and ElapsedPTInDays is the completed processing time of the lot measured in days. The variable "Today" is the current date, taken at any suitable hour of the day.

Controller 114 determines whether the vectored goal is greater than the normal goal in step 216. When the normal goal is greater than the vectored goal, such as when there is a lack of delay or a recovered delay where the lot is "on time," the normal goal is selected as a lot level goal in step 218. There is a lack of delay when the lot has processed according to schedule since beginning processing. As used herein, a recovered delay is when the fabrication facility has processed the lot for the amount of time that the lot was delayed in addition to processing for the amount of time that would be indicated by the normal goal. The controller may perform step 216 at any suitable interval, such as at the start of every day to calculate a goal for the amount of time to process each lot in that day.

When the vectored goal is greater than or equal to the normal goal, such as when there has been a delay, the vectored goal is selected as the lot level goal in step 220. The normal goal decreases when the vectored goal is selected and the lot is processed for more time than indicated by the normal goal in a given day, as can be appreciated from the description of the normal goal above. It should be appreciated that the normal goal decreases when there is a decrease in the average processing time that must be completed per day until the due date, even when a particular utilization of the normal goal indicates an increasing numerical value. Accordingly, selecting the vectored goal using the predetermined time in which to reduce the normal goal causes the lot to recover from the delay.

In some embodiments, the normal goal and vectored goal calculate the number of processes to be performed on each lot in each day or other selected time period. Unless specifically indicated otherwise, calculating processing time of the lot is meant to encompass calculating a number of process steps to be completed. For example, the amount of time for each processing step is known, and therefore the normal and vectored goals may be expressed as an amount of time or number of process steps.

In step 222, controller 114 calculates a current X factor of each lot. The current X factor is similar to a traditional critical ratio and is calculated based on a remaining processing time of the lot and is based on a difference between the due date of the lot and the current date. In the example provided, the current X factor is calculated according to: Current X factor=((Due Date)−(Current Date))/(remaining processing time). The due date of the lot is the date on which the semiconductor device is scheduled to be completed. The due date may also be known as a fabout date or a shipping date. The remaining processing time is the sum of theoretical raw process time of all fabrication operations that need to be performed before the semiconductor device is completed.

Controller 114 calculates a starting X factor of each lot in step 224. The starting X factor of the lot is based on a total amount of processing for the lot and on a difference between a due date of the lot and a start date of the lot. The starting X factor differs from the current X factor because the starting X factor considers only the starting conditions and requirements of the fabrication processes. In the example provided, the starting X factor is calculated according to:

Starting X factor=((Due Date)−(Start Date))/(Total Processing Time). The start date is the date on which the lot first entered the fabrication system 100 and the total processing time is the sum of theoretical processing time of all processes performed on the lot between the start date and completion of the semiconductor device.

Controller 114 calculates a critical ratio based on the starting X factor and the current X factor in step 226. The critical ratio is different from the traditional critical ratio because the critical ratio considers the starting X factor, as described above. In the example provided, the critical ratio is calculated as the current X factor divided by the starting X factor. The resultant value is multipled by a factor of 10.

Controller 114 normalizes the lot level goal and the critical ratio in step 228. After normalization, all lots that are late by a specified amount are treated equally. Similarly, all critical ratios that indicate lots that are ahead of schedule by a specified amount are treated equally. As used herein, treating the lots equally means giving equal prioritization with respect to the normalized lot level goal or normalized critical ratio. In the example provided, the lot level goal is divided by 48 and all lots that are highly delayed (e.g., lot level goal greater than or equal to 48 hours) are treated equally. Further in the example provided, the critical ratio is divided by 20, and all critical ratios that indicate very early lots (e.g., critical ratio greater than or equal to 20) are treated equally. It should be appreciated that other values or methods may be used for normalization without departing from the scope of the present disclosure.

In step 230, controller 114 calculates a weighted dispatch index based on a weighted lot level goal and a weighted critical ratio. Controller 114 ensures that lot level goals and critical ratio are synchronized in such a way that lesser the value of either of them, more is the criticality. The weighted lot level goal and weighted critical ratio are calculated by applying a weight to the lot level goal and the critical ratio, respectively, as will be appreciated by those with skill in the art. In the example provided, the lot level goal is given a large weight (e.g., 95%) and the critical ratio is given a small weight (e.g., 5%). Accordingly, the lot level goal largely dominates the weighted dispatch index before the lot has achieved the lot level goal. The lot level goal is achieved by processing the lot for the amount of time indicated by the lot level goal. Therefore, the weighted dispatch index prioritizes lots substantially based on the weighted lot level goal before the lot level goal has been achieved. The critical ratio term dominates when the lot level goals have been achieved, and therefore the weighted dispatch index prioritizes lots substantially based on the weighted critical ratio after the lot level goal has been achieved. In step 232, the fabrication system 100 selects lots to process in processing equipment 110 based on the weighted dispatch index.

Controller 114 determines whether a new calculation period has been reached in step 234. If a new calculation period has not been reached yet, Controller 114 updates lot level goals and current X factor of the lot based on progress made by the lot within the current day and recalculates Weighted Dispatch Index while keeping other components the same. For example if the lot level goal is 4 hours for the day and 6 hours later, the lot has processed 1 hour, controller 114 updates lot level goal as 3 hours for this lot. Likewise the current X factor is updated as well. The calculation period is a time period during which the normal goal and vectored goal are not recalculated. In the example provided, the new calculation period begins every 24 hours. Therefore, when a new calculation period has not been reached, controller 114 returns to step 232 to select lots for processing based on the recalculated weighted dispatch index. When a new calculation period has been reached, controller 114 returns to steps 212 to re-calculate all components of the Weighted Dispatch Index based on the current status of the fabrication system 100.

The methods and medium disclosed herein exhibit several beneficial attributes. For example, a method is disclosed that detects lots that are lagging due to delays and puts the lots back on track. Compared to prior methods, the method disclosed herein improves average cycle time, improves 95th percentile cycle time, reduces variability during fabrication, and improves capacity of the fabrication system, as will be appreciated by those with skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of prioritizing dispatch of a lot during semiconductor fabrication, the method comprising:
    calculating a lot level goal for processing time of the lot based on a normal goal in response to a lack of delay in processing the lot or in response to a recovered delay in processing the lot;
    calculating the lot level goal for processing time of the lot based on a vectored goal in response to a delay in processing the lot, wherein the vectored goal is based at least in part on a predetermined time in which to reduce the normal goal to recover from a delay in processing the lot;
    prioritizing dispatch of the lot based at least in part on the lot level goal; and
    processing the lot based on the prioritized dispatch.

2. The method of claim 1, wherein calculating the lot level goal based on the normal goal further comprises calculating the normal goal based on a processing time remaining for the lot and the remaining time before a due date of the lot.

3. The method of claim 2, wherein calculating the normal goal includes calculating a sum of raw process times remaining for the lot and a time remaining before the due date of the lot.

4. The method of claim 1, wherein prioritizing dispatch of the lot further comprises selecting a greater of the normal goal and the vectored goal as the lot level goal.

5. The method of claim 1, wherein prioritizing dispatch of the lot is further based on a weighted lot level goal and a weighted critical ratio.

6. The method of claim 5, wherein prioritizing dispatch is substantially based on the weighted lot level goal before the lot level goal has been achieved, and is substantially based on the weighted critical ratio after the lot level goal has been achieved.

7. The method of claim 5, wherein prioritizing dispatch based on the weighted critical ratio further comprises calculating a starting X factor of the lot based on a total amount of processing for the lot and on a difference between a due date of the lot and a start date of the lot.

8. The method of claim 7, wherein prioritizing dispatch based on the weighted critical ratio further comprises calculating a current X factor of the lot based on a remaining processing time of the lot and based on a difference between the due date of the lot and a current date.

9. The method of claim 8, wherein prioritizing dispatch based on the weighted critical ratio further comprises calculating the critical ratio by dividing the current X factor of the lot by the starting X factor of the lot.

10. The method of claim 1, wherein calculating the vectored goal is further based on a start date of the lot, a total amount of processing for the lot, a difference between the start date of the lot and a due date of the lot, and the completed processing time of the lot.

11. The method of claim 10, wherein calculating the vectored goal further comprises calculating:

$$TodayGoalsInHrs = \frac{24 * \left(\left(\frac{(n - StartDate) * TotalPTInDays}{DueDate - StartDate}\right) - ElapsedPTInDays\right)}{n - Today}$$

wherein TodayGoalsInHrs is the vectored goal, n is the predetermined time, StartDate is the start date of the lot, TotalPTInDays is the total amount of processing for the lot, DueDate is the due date of the lot, and ElapsedPTInDays is the completed processing time of the lot.

12. A method of fabricating a semiconductor device from a substrate, the method comprising:
 providing a lot that includes the substrate;
 prioritizing dispatch of the lot according to a dispatch method comprising:
  calculating a lot level goal for processing time of the lot based on a normal goal in response to a lack of delay in processing the lot or in response to a recovered delay in processing the lot;
  calculating the lot level goal for processing time of the lot based on a vectored goal in response to a delay in processing the lot, wherein the vectored goal is based at least in part on a predetermined time in which to reduce the normal goal to recover from a delay in processing the lot; and
  prioritizing dispatch of the lot based at least in part on the lot level goal; and
 processing the lot based on the dispatch method.

13. The method of claim 12, wherein calculating the lot level goal based on the normal goal further comprises calculating the normal goal based on a processing time remaining for the lot and the remaining time before a due date of the lot.

14. The method of claim 12, wherein prioritizing dispatch of the lot is further based on a weighted lot level goal and a weighted critical ratio.

15. The method of claim 14, wherein prioritizing dispatch is substantially based on the weighted lot level goal before the lot level goal has been achieved, and is substantially based on the weighted critical ratio after the lot level goal has been achieved.

16. The method of claim 14, wherein prioritizing dispatch based on the weighted critical ratio further comprises calculating a starting X factor of the lot based on a total amount of processing for the lot and on a difference between a due date of the lot and a start date of the lot.

17. The method of claim 16, wherein prioritizing dispatch based on the weighted critical ratio further comprises calculating a current X factor of the lot based on a remaining processing time of the lot and based on a difference between the due date of the lot and a current date.

18. The method of claim 12, wherein calculating the vectored goal is further based on a start date of the lot, a total amount of processing for the lot, a difference between the start date of the lot and a due date of the lot, and the completed processing time of the lot.

19. The method of claim 18, wherein calculating the vectored goal further comprises calculating:

$$TodayGoalsInHrs = 24 * \left(\left(\frac{(n - StartDate) * TotalPTInDays}{DueDate - StartDate}\right) - ElapsedPTInDays\right)$$

wherein TodayGoalsInHrs is the vectored goal, n is the predetermined time, StartDate is the start date of the lot, TotalPTInDays is the total amount of processing for the lot, DueDate is the due date of the lot, and ElapsedPTInDays is the completed processing time of the lot.

20. A non-transitory computer readable medium storing control logic for operating a computer system, the control logic including control logic instructions for:
 calculating a lot level goal for processing time of a lot during semiconductor fabrication based on a normal goal in response to a lack of delay in processing the lot or in response to a recovered delay in processing the lot;
 calculating the lot level goal for processing time of the lot based on a vectored goal in response to a delay in processing the lot, wherein the vectored goal is based at least in part on a predetermined time in which to reduce the normal goal to recover from a delay in processing the lot;
 prioritizing dispatch of the lot based at least in part on the lot level goal, and
 processing the lot based on the prioritized dispatch.

* * * * *